(12) United States Patent
Bucher

(10) Patent No.: US 8,520,223 B2
(45) Date of Patent: Aug. 27, 2013

(54) WET PAINT COATING THICKNESS MEASUREMENT AND INSTRUMENT

(76) Inventor: Udo Wolfgang Bucher, Darlinghurst (AU)

( * ) Notice: Subject to any disclaimer, the term of this patent is extended or adjusted under 35 U.S.C. 154(b) by 91 days.

(21) Appl. No.: 13/322,414

(22) PCT Filed: May 25, 2010

(86) PCT No.: PCT/AU2010/000631
§ 371 (c)(1),
(2), (4) Date: Dec. 15, 2011

(87) PCT Pub. No.: WO2010/135769
PCT Pub. Date: Dec. 2, 2010

(65) Prior Publication Data
US 2012/0076923 A1 Mar. 29, 2012

Related U.S. Application Data

(60) Provisional application No. 61/254,929, filed on Oct. 26, 2009.

(30) Foreign Application Priority Data

| May 26, 2009 | (AU) | 2009902392 |
| Jun. 30, 2009 | (AU) | 2009903058 |
| Sep. 15, 2009 | (AU) | 2009904454 |
| Oct. 14, 2009 | (AU) | 2009904991 |
| Oct. 23, 2009 | (AU) | 2009905169 |
| Nov. 10, 2009 | (AU) | 2009905487 |

(51) Int. Cl.
*G01B 11/28* (2006.01)

(52) U.S. Cl.
CPC .................................... *G01B 11/28* (2013.01)
USPC ........................................................ 356/630

(58) Field of Classification Search
CPC ..................................................... G01B 11/28
USPC ........................................ 356/630, 445–448
See application file for complete search history.

(56) References Cited

U.S. PATENT DOCUMENTS

| 4,182,259 | A | * | 1/1980 | Garner et al. | 118/712 |
| 4,852,515 | A | * | 8/1989 | Terasaka et al. | 118/663 |
| 6,074,483 | A | * | 6/2000 | Belotserkovsky et al. | 118/665 |
| 6,639,673 | B1 | * | 10/2003 | Freund et al. | 356/369 |
| 2002/0131058 | A1 | * | 9/2002 | Luxem | 356/630 |

* cited by examiner

Primary Examiner — Michael P Stafira
(74) Attorney, Agent, or Firm — Barnes & Thornburg LLP

(57) ABSTRACT

An instrument is described for measuring the thickness of a paint coating on a rotating roll of a roll coating applicator roll for determination of the thickness of a paint coating to be applied to a moving substrate comprising: sensor means arranged for emitting and detecting signals reflected from the surface of the paint coating on at least one roll of the roll coating applicator to generate data indicative of the position of the surface of the paint on the roll, the sensor means being distanced from the paint coating for the emission and detection of the signals; and processing means for processing the data generated by the sensor means to determine the thickness of the paint coating to be applied to the substrate.

20 Claims, 6 Drawing Sheets

WET PAINT COATING THICKNESS MEASUREMENT AND INSTRUMENT

CROSS-REFERENCE TO RELATED APPLICATIONS

This application is the U.S. national phase of PCT/AU2010/000631 filed May 25, 2010. PCT/AU2010/000631 claims the benefit under the Convention of Australian Patent Application Nos. 2009902392, 2009903058, 2009904454, 2009904991, 2009905169, 2009905487 and U.S. Provisional Patent Application No. 61/254,929 filed May 26, 2009, Jun. 30, 2009, Sep. 15, 2009, Oct. 14, 2009, Oct. 23, 2009, Nov. 10, 2009 and Oct. 26, 2009 (respectively). The entire disclosures of PCT/AU2010/000631, Australian Patent Application Nos. 2009902392, 2009903058, 2009904454, 2009904991, 2009905169, 2009905487 and U.S. Provisional Patent Application No. 61/254,929 are hereby incorporated by reference.

FIELD OF THE INVENTION

The invention relates to methods for measuring the thickness of a paint coating applied or to be applied to a substrate, and to instruments for use in these methods. The invention has particular application to periodic and to continuous real time measurement of the wet paint thickness of a paint coating either before or during application of the paint coating to the substrate. The invention has particular application on a roll coater, for example as used on a continuous coil paint coating line used for painting metal strip. The invention is not limited to metal coil painting, for example printing, lacquering, and hot melt paint coating processes that utilise rolls in the coating application step may also benefit from the invention.

BACKGROUND OF THE INVENTION

Paint coatings are applied in the manufacture and finishing of a vast range of goods and products including metal sheet and coil, timber flooring, automobiles, aeroplanes, fencing, glass, packaging and the like. In the area of metal sheet and coil, the substrate is typically galvanized steel, aluminium, stainless steel, or zinc alloy coated steels including aluminium-zinc and zinc-magnesium coated steels.

Devices are available to measure the paint coating thickness on these products to avoid costly wastage of the paint coating material, and to ensure the quality of the finished product. These devices include magnetic sensors, ultrasonic sensors, and mechanical-optical devices such as the commercially available DJH gauge system (DJH Designs Inc. Oakville, ON, Canada). This system involves mechanically boring a shallow crater through a painted surface into the underlying substrate of a sample. The sample is then placed under a microscope and the crater is viewed on a high resolution monitor for determination of the paint coating thickness. Likewise, paint coating thickness can be determined by sectioning a sample cut from a coated product and viewing the sample under high magnification. Other methods include the use of a micrometer to measure thickness of the coated article, stripping off the paint coating, re-measuring the article, and calculating the paint coating thickness as the difference between the two readings. However, the above techniques either have limited accuracy, or they are very time consuming and labour intensive. Moreover, they do not measure or monitor the thickness of the wet paint coating during the paint coating process for determination of the final dry paint coating thickness.

Lasers have also been used in the past for the measurement of paint coating thickness, for example, as described US 848,785 (EP 2 031 347 A1). The method described in EP 2031347 requires knowledge of the original thickness/dimensions of the substrate before the paint coating is applied to the substrate, in order to calculate the thickness of the paint coating using a laser sensor. These measurements are static measurements, and the thickness/dimensions of the substrate are known in advance. In particular, a laser sensor is used to measure the size of the substrate before it is coated, and to monitor the paint coating thickness during the application/deposition of the paint coating to determine the end point for the paint coating deposition process. However, the methods and apparatus described EP 2031347 are not suitable for the measurement of opaque paint coatings of greater than about 4 $\mu M$ thickness, when the paint coatings are applied to a substrate of unknown size, or are moving at speeds of greater than about 15 meters per minute during an industrial paint coating process.

SUMMARY OF THE INVENTION

The invention in one or more forms relates to measuring the thickness of a wet paint coating to be applied to a surface of a substrate by a roll coating applicator. The invention further comprises controlling the wet thickness of the paint coating on a roll of the paint coating applicator. The invention further encompasses monitoring and/or controlling the wet paint coating thickness and thereby, the dry thickness of the paint coating.

In one aspect of the invention there is provided an instrument for measuring the thickness of a paint coating on a rotating roll of a roll coating applicator roll for determination of the corresponding thickness of a paint coating to be applied to a substrate comprising:

sensor means arranged for emitting and detecting signals reflected from the surface of the paint coating on at least one roll of the roll coating applicator to generate data indicative of the position of the surface of the paint on the roll, the sensor means being distanced from the paint coating for the emission and detection of the signals; and processing means for processing the data generated by the sensor means to determine the thickness of the paint coating to be applied to the substrate.

In one aspect of the invention there is provided an instrument for measuring the thickness of a paint coating on a rotating roll of a roll coating applicator roll for determination of the corresponding thickness of a paint coating to be applied to a substrate comprising:

sensor means arranged for emitting and detecting signals reflected from the surface of the paint coating on at least one roll of the roll coating applicator to generate one or more data sets consisting of data indicative of the position of the surface of the paint on the roll, the sensor means being distanced from the paint coating for the emission and detection of the signals; and processing means for processing the data generated by the sensor means and reference data, the processing means adapted to store the reference data or derivatives of the reference data for ongoing use to determine the thickness of the paint coating on the roll.

In one aspect of the invention there is provided an instrument for measuring the thickness of a paint coating on a rotating roll of a roll coating applicator roll for determination of the corresponding thickness of a paint coating to be applied to a substrate comprising:

sensor means arranged for emitting and detecting signals reflected from the surface of the paint coating on at least one roll of the roll coating applicator to generate one or more data sets consisting of data indicative of the position of the surface of the paint on the roll, the sensor means being distanced from the paint coating for the emission and detection of the signals; and processing means for processing the data generated by the sensor means and reference data to determine the thickness of the paint coating on the roll for determination of the thickness of the paint coating to be applied to the substrate, the reference data being derived from one of:

measurements by the sensor means of the position of the corresponding surface of the roll in the roll coating applicator, measurements by a further remote non contact sensor means of any attached surface of the roll in the roll coating applicator, or dynamic measurements of the thickness of the paint coating applied to the substrate.

In one aspect of the invention there is provided an instrument for measuring the thickness of a paint coating on a rotating roll of a roll coating applicator roll for determination of the corresponding thickness of a paint coating to be applied to a substrate comprising:

sensor means arranged for emitting and detecting signals reflected from the surface of the paint coating on at least one roll of the roll coating applicator to generate one or more data sets consisting of data indicative of the position of the surface of the paint on the roll, the sensor means being distanced from the paint coating for the emission and detection of the signals; and processing means for processing the data generated by the sensor means and reference data to determine the thickness of the paint coating on the roll for determination of the thickness of the paint coating to be applied to the substrate, and memory means to record the reference data derived, the reference value being for use in combination with ongoing (or subsequent) measurements of the position of the surface of the wet paint on the roll to determine ongoing wet paint coating thickness values on the roll surface, and periodically updating the reference data.

The sensor means being intrinsically safe or adapted to operate in a Zone 1 environment, that is, adapted to avoid exposure of any potential spark or power source including electric current that may be generated within the sensor from reaching the environment in which the sensor is operating. The sensor means being adapted to emit white light, and the reflected signal detected by the sensor means being a narrow range of frequencies of the white light in focus at the surface being measured.

In another aspect of the invention there is provided a method for measuring the thickness of a paint coating applied to a substrate by a roll coating applicator, comprising:

(a) providing sensor means for emitting and detecting signals reflected from the surface of the paint coating on at least one roll of the roll coating applicator and at least one corresponding roll surface to generate one or more data sets consisting of data indicative of the position of the surface of the paint coating on the roll and further data indicative of the position of the corresponding roll surface;

(b) generating the data sets using the sensor means to measure the position of the surface of the paint coating and the corresponding roll surface, the sensor means being distanced from the roll and the corresponding roll surface for the emission and detection of the signals; and (c) processing the data sets generated by the sensor means to determine the thickness of the paint coating on the roll for determination of the thickness of the paint coating applied to the substrate.

Instruments and methods embodied by the invention can be used to measure the thickness of the wet paint coating to be applied to the substrate during the setting up of the roll paint coating applicator prior to application of the paint coating to the substrate and/or to measure the thickness of the paint coating being applied to the substrate during the paint coating application process (i.e., during a production run). If the determined thickness of the paint coating differs from a predetermined target reference thickness, one or more operating parameters of the roll coating applicator can be adjusted (e.g., by control means) to reduce the difference between the paint coating being applied to the substrate by the roll coating applicator and the target thickness. Alternatively the viscosity of the paint can be altered to adjust the paint coating thickness. One way of adjusting the paint coating viscosity is to adjust and control its temperature.

Hence, monitoring and/or controlling the thickness of the paint coating can comprise:

comparing the determined thickness of the paint coating on the roll of the roll coating applicator with a predetermined target thickness, and if it is determined that a difference exists;

adjusting the thickness of the paint coating on the roll or on the substrate to reduce the difference between the determined thickness and the target thickness.

In another aspect of the invention there is provided apparatus for controlling the thickness of a wet paint coating applied to a substrate by a roll coating applicator, comprising:

sensor means arranged for emitting and detecting signals reflected from the surface of the paint coating on at least one roll of the roll coating applicator and at least one corresponding roll surface to generate one or more data sets consisting of data indicative of the position of the surface of the paint coating on the roll and further data indicative of the position of the corresponding roll surface, the sensor means being distanced from the paint coating and the corresponding roll surface for the emission and detection of the signals (signals in this context including beams of electromagnetic radiation, for example light beams);

processing means for processing the data sets generated by the sensor means to determine the thickness of the paint coating on the roll for determination/calculation of the thickness of the paint coating being applied to the substrate; and control means for adjusting one or more operating parameters of the roll coating applicator to alter the thickness of the paint coating applied to the substrate by the roll coating applicator to reduce thickness difference, if present, between a predetermined target thickness of the paint coating and the determined thickness.

The control means can comprise means for controlling the temperature and/or the viscosity of the paint coating medium.

Typically, the data indicative of the position of the surface of the paint coating on the roll coating applicator in an embodiment of the invention is obtained during relative movement of the roll with respect to the sensor means.

Typically, the position of the sensor means from the surface of the paint coating and/or the corresponding roll surface is maintained essentially constant for the generation of respective of the data sets.

Typically, the sensor means utilised in an instrument and apparatus of the invention comprises at least one displacement sensor for measuring the distance to at least one of the corresponding roll surface and the surface of the paint coating on the roll of the roll coating applicator and most usually, both of those distances. That is, separate displacement sensors can be used to measure the distance to the corresponding roll surface and the distance to the surface of the paint coating on the roll, or both measurements can be made by the same displacement sensor. Most typically, one displacement sensor is used.

The signals reflected from the paint coating and corresponding roll surface s and detected by the sensor means in at least some embodiments of the invention are electromagnetic radiation signals, and can be of any wavelength deemed suitable. The reflected signals can be continuous or pulsed signals.

Typically, measurements of the paint coating surface position and the corresponding roll surface when taken with one displacement sensor are taken in succession.

The corresponding roll surface can be selected from the group consisting of a surface of any of the rolls of the roll coating applicator (e.g., a paint coating pick-up roll or a paint coating roll). Typically, the corresponding roll surface is an outer circumferential work face of the same roll on which the position of the surface of the paint coating is determined. However, it will be understood the corresponding roll surface can be any surface deemed suitable. In some embodiments, data indicative of the position of a plurality of different corresponding roll surface s can be obtained and a single corresponding roll surface value calculated from that data for use in determining the thickness of the wet paint coating on the substrate as described herein.

Data forming the respective data sets can, for example, comprise discrete measurements of the position of the corresponding roll surface and the surface of the paint coating on the roll, and/or average positions of one or both of those surfaces.

Typically, the thickness of the paint coating in a method of the invention is determined by comparing the difference(s) between the data indicating the position of the corresponding roll surface and the data indicating the position of the surface of the paint coating on the roll of the roll coating applicator. To determine the dry thickness of the paint coating on the substrate, the determined wet paint coating thickness may be multiplied by the (e.g., percentage) volume solids of the wet paint coating.

The predetermined target reference thickness can be a specific value or a thickness range.

As will be understood, the invention in one or more embodiments provides not only for measuring, monitoring and/or controlling the thickness of the wet paint coating on the roll of the roll coating applicator for application of the paint coating to the substrate but also, to the thickness of the wet paint coating applied to the end product substrate and the thickness of paint coating once dry.

Typically, the substrate is a sheet material such as sheet metal (e.g., sheet steel) with or without an existing corrosion resistant (e.g., a suitable metallic alloy) paint coating although, the substrate can be any manufactured article that is coated by an industrial paint coating process.

The term "paint coating" as used herein is to be taken to encompass composite paint coatings comprising one or more paint coating layers.

The paint coating can be any organic coating and the method and instrument can be applied to non pain inorganic coatings that are amenable to determination of thickness in accordance with a method of the invention. These coatings may be selected from a layer of paint, lacquer, varnish, plastisol, aqueous slurry, a hot melt paint coating, molten polymer coating, inorganic chemical coating, conversion coating, pre-treatment coating, and a particulate coating. When the paint coating is a coat of paint it can, for example, comprise a paint primer, undercoat, topcoat, clear coat, wash coat, or a combination of one or more of the foregoing.

Advantageously, one or more embodiments of the invention allow the thickness of the paint coating applied to the substrate to be adjusted during a production run thereby enabling variation in the thickness to be reduced and/or the thickness of the paint coating to be maintained substantially constant or within the predetermined target thickness range as the paint coating is being applied. This can provide not only a more uniform paint coating on the substrate but also provide a significant reduction in the total amount of the particular paint coating applied with the potential for corresponding production cost savings. Moreover, by measuring the thickness of the paint coating on the roll(s) of the roll coating applicator prior to the application of the paint coating to the substrate as provided for by at least some embodiments of the invention, wastage of the substrate itself can be reduced through the application of the required paint coating thickness to the substrate essentially at the commencement of the production run and/or by otherwise avoiding or reducing the need to make direct measurements of the paint coating thickness from the coated substrate itself.

The features and advantages of the invention will become further apparent from the following detailed description of exemplary embodiments of the invention and the accompanying drawings.

BRIEF DESCRIPTION OF THE ACCOMPANYING DRAWINGS

Figure 1:
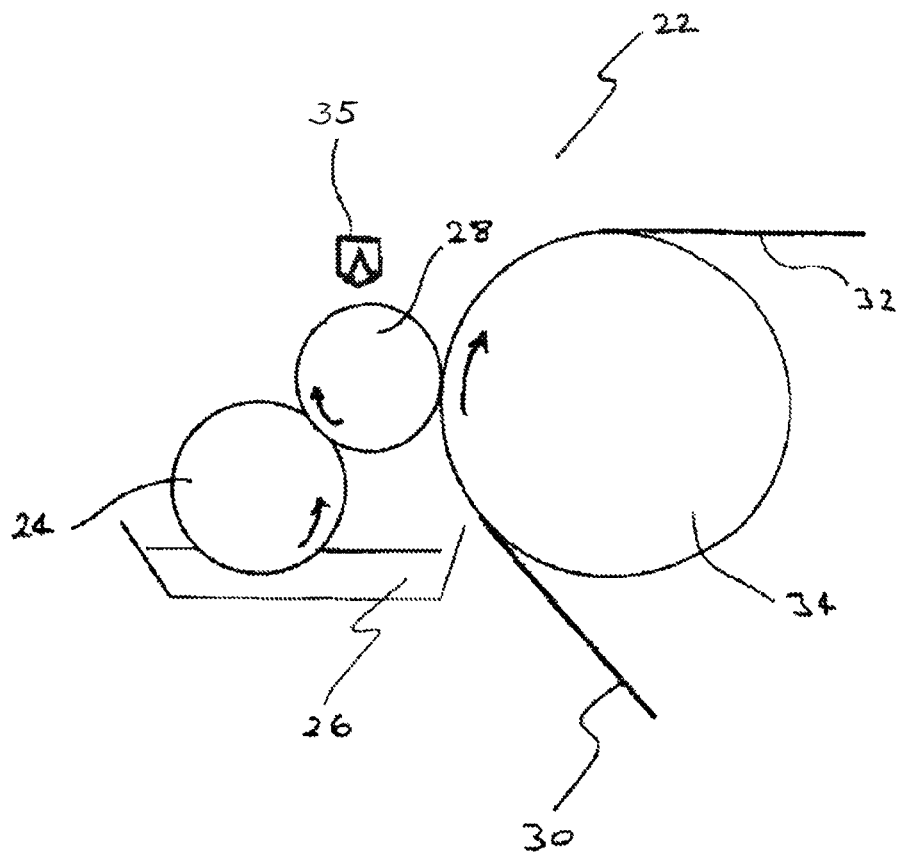
FIG. 1 is a schematic diagram of a roll paint coating applicator operating in reverse coating mode for paint coating metal strip in accordance with an embodiment of the invention.

FIGS. 4A to 4D show four flow charts that at least partially illustrate the steps taken at the coater and in the processing means to measure paint thickness both before and during painting. In the first column of FIG. 4A the procedure for measuring wet paint film thickness on the coater roll during coater set up before paining is illustrated; the second column illustrates the comparison of film thickness measurements from column one with required reference values; column 3 illustrates the procedure for deciding whether to commence or continue painting based on a comparison with the required or specified coating thickness; and column four illustrates ongoing paint thickness measurement and adjustment of the coater to achieve the target thickness. The flow chart in FIG. 4D further shows how wet paint thickness is translated to dry paint thickness being applied to the substrate and FIGS. 4 B and 4C show how reference values and further reference factors are generated for accurate ongoing measuring and monitoring of paint film thickness, i.e., by compensation for drift in readings that do not relate to changed thickness.

DETAILED DESCRIPTION OF EXEMPLARY EMBODIMENTS OF THE INVENTION

The substrate to which the paint coating is applied in a method embodied by the invention can be sheet metal strip such as galvanized steel strip, or zinc alloy coated steel strip including aluminium-zinc and zinc-magnesium coated alloy steels. The thickness of the steel substrate as well as its metallic paint coating can each exhibit significant thickness variation, which can occur over a short, medium or long distance, from micrometers to meters. This variability of the underlying substrate thickness is one of a number of factors that contributes to difficulty in making dynamic measurements of paint coating thickness during a paint coating process. It is one of the main reasons why some other continuous paint thickness measuring instruments and methods fail to achieve accurate values for paint thickness.

FIG. 4 shows the sequential steps performed in reverse coating mode of embodiments of the present invention. It particularly illustrates coater set up procedures, processes undertaken by the processing means of instruments embodied in the invention, and methods for determining reference values and further reference factors used in measurement and ongoing monitoring of paint thickness, both wet and dry.

Apparatus in accordance with the invention for monitoring and/or controlling wet paint film thickness applied to a substrate such as sheet steel strip is described below with reference to FIG. 1 which shows a roll paint applicator (22). The roll coating applicator (22) comprises a precision metal paint pick up roll (24) (also known as a metering roll) arranged to pick up paint from a paint tray (26) and transfer the paint to a counter rotating paint coating roll (28) having an outer paint coating/contact surface formed from polyurethane rubber (or other suitable plastics or elastomeric material). The paint coating roll (28) applies the paint to the substrate being coated, in this instance essentially flat steel strip (30) with a zinc-aluminium protective paint coating to produce a coated strip (32). The steel strip is unrolled from a pre-coiled roll of the strip (not shown) and fed around a support roll (34) under tension to provide essentially constant positioning of the strip (30) for application of the paint to the strip by the paint coating roll. To apply the paint, the paint applicator is typically moved to bring the paint coating roll (28) into contact with the moving steel strip. While in the embodiment shown a paint tray is provided, any suitable method for providing the paint to the pickup roll (24) can be utilized.

Optionally, prior to the commencement of paint being applied to the paint coating roll (28), the position of the surface of the roll is characterized (with respect to position, eccentricity, and so forth) using a displacement sensor (35) to obtain reference measurements. These reference measurements can take the form of an averaged set of readings (preferably a moving average or a weighted moving average) over one or more complete rotation/s of the paint coating roll, or they may be exact measurements of specific points on the roll surface, thus producing an accurate record of the roll rotational profile (including variation in the surface location arising from movement associated with bearing and mechanical tolerances in the roll support and drive mechanisms). Alternatively, in another embodiment, the position on a circumferential line around the roll corresponding roll surface can be measured during the rotation of the roll.

Figure 4A:
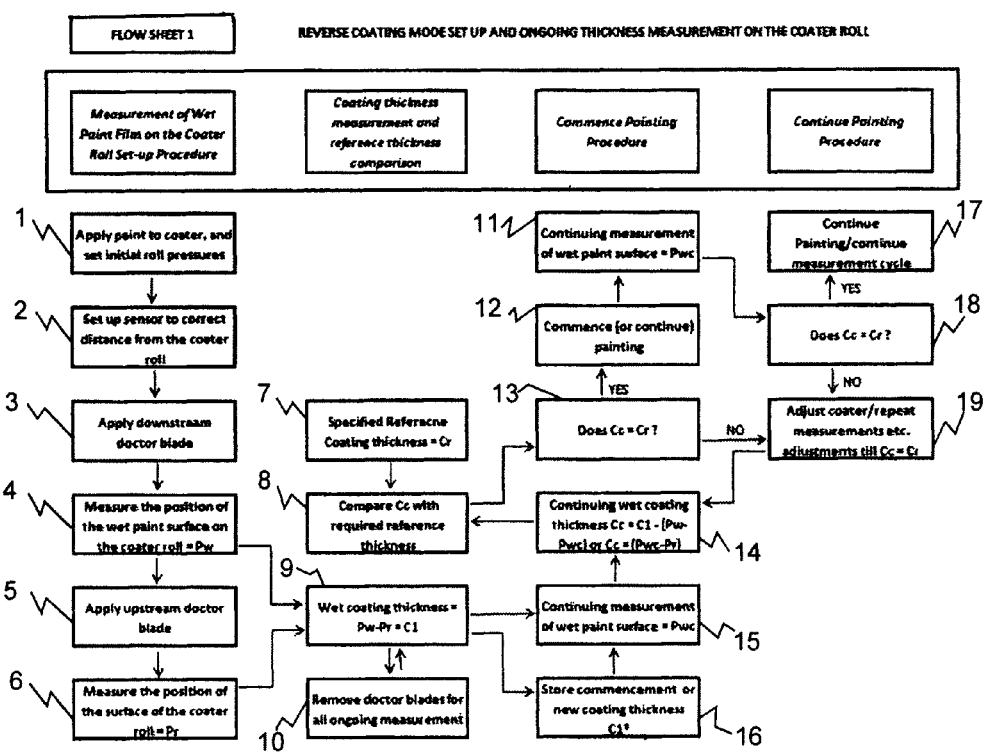
Figure 4B:
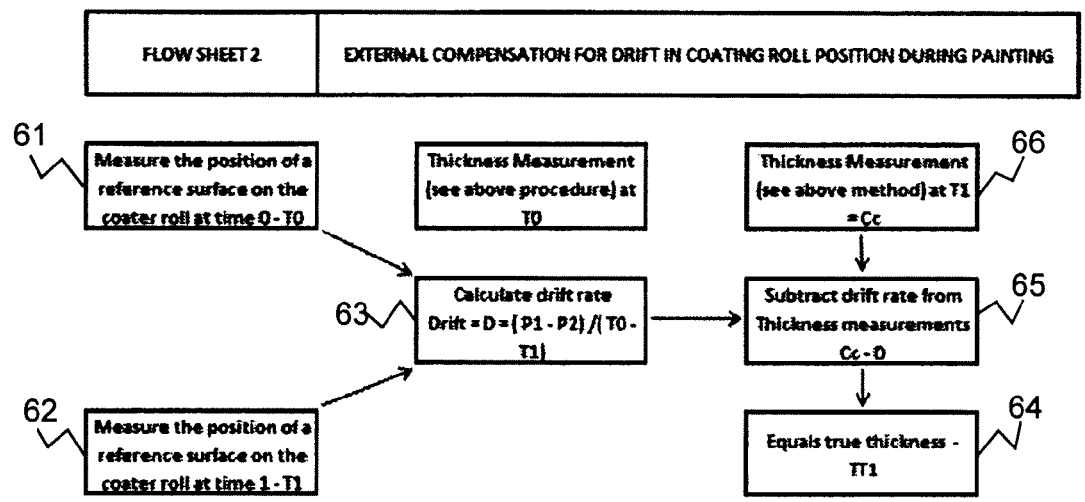
Figure 4C:
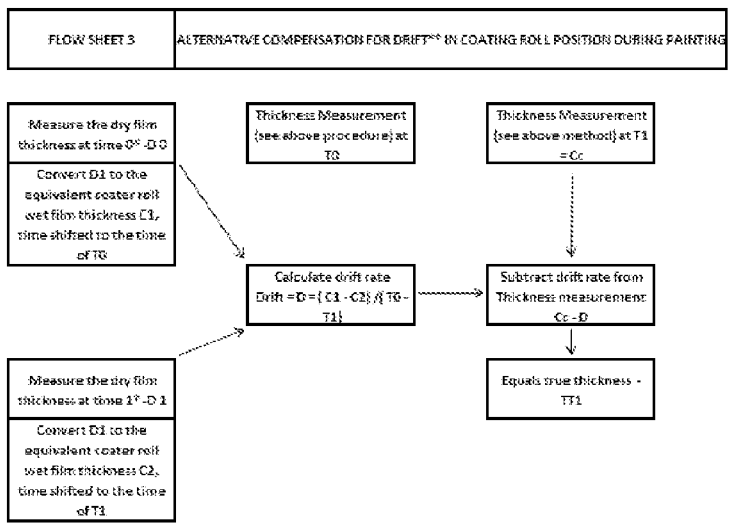

Once the paint applicator is set up with paint on the rolls as shown in FIG. 4A (1) in readiness for application of the paint to the strip (18), the position of the surface of the paint coating on the coating roll (28) is then measured using the displacement sensor (35) to provide a set of measurements of the position of the wet paint surface. These can be either averaged values or values that correspond to an exact position or a number of positions of the surface of the paint layer around the circumference of the paint coating roll (28). During application of paint to the roll coater, and during set up of the rolls of the roll coater the position of roll (28) will shift, and this changed roll position is measured by a sensor (not shown). Measurement values corresponding to the shift in position of roll (28) are subtracted from measurement values of the position of the upper surface of the paint on roll (28) (or from derivative data sets thereof). The wet paint coating film thickness on the paint coating roll (28) is thus calculated using the two sets of measurements and the measured shift in the position of roll (28), that is, by comparing the reference measurements representing the roll surface and the paint coating surface measurements, typically by subtracting one from the other. Such calculations are programmed into software on a computer that form the data processing means.

The method for measuring wet paint thickness on the paint coating roll (28) described above can be equally applied to measurement of wet paint thickness on the pickup roll (24) as it rotates away from the paint coating roll. In at least some instances, the wet paint thickness on the pickup roll can be determined. The displacement sensor can be mounted to a scanning stage that traverses across the circumferential work face of the paint coating roll (28) or pick up roll (24) to provide data at multiple positions across the relevant roll for the determination of the thickness of the wet paint coating. In a variation of this approach, multiple displacement sensors can be arranged to obtain measurements across the roll. The paint coating process can be either a forward or a reverse paint coating process, these processes being well understood by the person skilled in the art.

Data for the position of both the surface of the roll and the surface of the wet paint coating can be generated at each position, and processed as described above to provide a profile of the paint thickness across the roll work face. Baseline or zero values can also be calculated and stored for each position and used for subsequent determinations of the thickness of the wet paint coating at respective of the positions.

The paint (or other paint coating) can be dried, set or cured during the paint coating process by passing the coated section of the steel strip through a UV or electron beam curing station, or a drying furnace or oven that is located downstream from the roll coating applicator on the production line as further described below.

In some embodiments, particularly prior to a production (e.g., painting) run, a scraper (34) or doctor blade can be applied to the paint coating roll to temporarily remove a narrow band of paint on that roll to expose the surface of the roll upstream of the displacement sensor, referenced in FIG. 4A (5), in order to obtain or to verify the surface position reference measurement(s) of the roll surface as illustrated in FIG. 4A (6).

The measurement(s) of the position of the surface of the wet paint coating is made just prior to and/or soon after the reference measurements are made. Preferably, during the measurements of the position of the wet paint surface another doctor blade (35) is applied to the paint coating roll downstream essentially in line with the position of the displacement sensor to remove a narrow band of paint, illustrated in FIG. 4A (3). This has the benefit of providing a more uniform wet paint coating thickness originating from the nip point between the roll coater apparatus rolls (24) and (28) during times when paint is not being applied to the substrate (that is, during setting up the roll coater apparatus in preparation for production). It will be understood that this method may also be applied to position measurements made on the pick-up roll. Once the position measurements of the corresponding roll surface and the wet paint surface are made they are used to calculate the thickness of the wet paint on the applicable roll, illustrated in FIG. 4A (9). The thickness value of the paint or a derivative value is stored in a computer memory, illustrated in FIG. 4A (16), and this value is optionally used in ongoing measurements of coating thickness, illustrated in FIG. 4A (14) and (16). Once a thickness value of a layer of paint on a roll of the coater has been determined, ongoing measurements of the paint thickness may be based on the previously determined value for the coating thickness and measuring the change in the position of the surface of the wet paint on the roll. For example if an initial coating thickness of 50 micrometres has been determined, and the position of the surface of the wet paint on the roll has fallen by 5 micrometres, the new paint film thickness is 45 micrometres, all other factors being equal.

The thickness of the dried paint on the steel strip can also be measured in real time downstream of the roll paint applicator (22), for example using the methods and instruments described in a further PCT patent application covering this type of dry film thickness instrument (after the curing/drying station), also by the current applicant. These dry film thickness measurements can be used to periodically to provide new or replacement ongoing reference values or calibration values used by the processing means for the ongoing determination of wet paint thickness on the coater roll. Such dry film thickness measurements can be used to compensate for any shift in the position of the roll being monitored by the sensor means.

During painting the position of coater roll (28) (and the pickup roll) will shift, for example due to thermal expansion of the roll bearings or due to swelling of the rubber covering on the surface of the coating roll. This changed roll position is optionally measured by a sensor (not shown), or the shift in roll position may be determined from the measurement of the surface of the wet paint on the roll over a time frame during periods of constant wet paint thickness within that time frame. If using a sensor to detect the shift in the position of a roll, the sensor could be located to measure the position of the rotating roll journal or the roll periphery. Alternatively, measuring real time values of dry film thickness on the coil coating line provides data that can be used to compensate for any change in the position of the coating roll, (for example by comparing a series of wet and dry film thickness values over a time frame). Measurement values corresponding to the shift in position of roll (28) are subtracted from measurement values of the position of the upper surface of the paint on roll (28) (or from derivative data sets thereof). The wet paint coating film thickness on the paint coating roll (28) is thus at least partially calculated by subtracting the measured value for shift in the roll position from the measured value for the position of the wet paint surface on the same roll. The wet paint coating film thickness on the paint coating roll (28) is thus also calculated by subtracting the two sets of measurements and the measured shift in the position of roll (28), that is, by comparing the reference measurements representing the roll surface and the paint coating surface measurements, typically by subtracting one from the other. Alternatively the current values for coating thickness are calculated by subtracting the value for the shift in the roll from the known thickness of the wet paint as measured by any of the embodiments of this invention. Such calculations are programmed into software on a computer that form the data processing means.

Any difference between the measured wet paint thickness required to provide the final dry paint thickness on the substrate and the predetermined target thickness of the dried paint, illustrated in FIG. 4A (7), can be determined by comparison of these values (typically by subtracting one from the other), illustrated in FIG. 4A (8) and (13). The thickness of the wet paint on the paint coating roll (16) or pick up roll (12) can then be adjusted to provide the target dry paint thickness on the substrate, illustrated in FIG. 4A (18) and (19). The required or target wet paint thickness can be determined by dividing the target dry paint thickness by the volume of the solids (e.g., on a percentage basis) of the applied wet paint. The volume solids of the paint or other paint coating can be determined by any suitable known method, such as described in the Applicants co-filed International Patent Application the contents of which is incorporated herein in its entirety by cross reference.

There are many configurations of roll paint applicators using different arrangements of rolls. The invention is not limited to any specific applicator roll arrangement and measurement, monitoring, and controlling the wet paint film build on any of the rolls either before or during application of the paint to the strip/substrate as described herein using displacement sensor(s) is expressly encompassed by the invention. The adjustment(s) needed to alter the wet paint coating thickness of such roll paint applicators are known in the art. For example, reducing the contact pressure between the paint coating roll (28) and the pickup roll (24) will result in a higher film thickness on the strip, as will increasing the rotational velocity of the coating roll (28) relative to the strip speed (in reverse coating mode). The thickness of the layer of paint transferred to the paint coating roll (28) by the pickup roll (24) is proportional to the rotational velocity of one relative to the other. In particular, once the paint thickness is determined on one of the rolls (24, 28) of the roll coating applicator (22), the corresponding paint thickness on the other of the rolls (24, 28) (as well as the thickness of the paint applied to the strip (30) can be determined using formula known in the art. In this regard, as the paint is metered through the nip between the two rolls, the paint coating is divided ("split") between those rolls on the exit side of the nip point. The split in paint thickness between the two rolls is proportional to the relative rotational velocity of each roll and in some instances may be influenced, typically only slightly, by the surface roughness of the rolls. The thickness of the wet paint coating applied to the strip (30) is a function of the speed ratio between the strip and the coating roll (28), illustrated in FIG. 4D (1), (2), and (4). The applied thickness of the wet paint to the strip can, for example, be increased by increasing the rotational velocity of the coating roll (28) or decreasing the speed of the strip (in reverse coating mode). Formula defining this paint coating thickness and speed relationship are known in the art and are described below. Increasing the roll speed of the applicator relative to the strip speed will increase the products paint thickness (and vice versa). This proportional relationship is well understood by those skilled in the art. Furthermore, (in reverse paint coating mode) not all of the paint on the paint coating roll is transferred to the strip at the paint application point (i.e., where the paint coating roll meets the strip) as some of the paint remains on the paint coating roll on its rotational path past the application point. This volume of paint that is not applied to the strip is known as 'leakage', illustrated in FIG. 4D (73). The leakage on the paint coating roll can be measured in accordance with the invention by a displacement sensor pointed at a location on the paint coating roll downstream of the application point (i.e., after the bulk of the paint has been transferred from the applicator roll onto the strip). A value for paint leakage can be subtracted, illustrated in FIG. 4D (75), from the total thickness of paint available for transfer onto the strip by the coater roll, thereby determining an accurate value for paint coating thickness applied to the strip by the applicator roll. The leakage thickness value used for this purpose can be a leakage value measured in real time, or an estimate based on measurements for the combination of: particular paint type/specific coater (optionally including a particular coating roll)/coating mode/coating application conditions. A further embodiment of this invention entails measuring the wet paint thickness on the paint coating roll and calculating the thickness of the wet paint being applied to the strip by the formula:

Wet paint thickness on the strip=(Wet paint thickness on the paint coating roll×paint coating roll surface speed/strip speed)−leakage, wherein:

Wet paint thickness on the paint coating roll=paint coating surface position (on the roll) (height with paint)−roll surface position (height without paint, i.e., the reference measurement).

The wet paint surface position and the corresponding roll surface position measurements may be specific, averaged or otherwise mathematically processed values. When using averaged data, the value representing the position of the wet paint film surface and the value representing the reference coating roll surface is measured as a time based measurement for the same number of whole revolutions of the roll. Moreover, the leakage can either be measured or estimated for a painting set up based on measurements of leakage made under production conditions that are representative of the production scenario, wherein these measurements and estimates are based on the methods and apparatus described herein.

The above equations apply to reverse paint coating, which is depicted in FIG. 1

Figure 2:
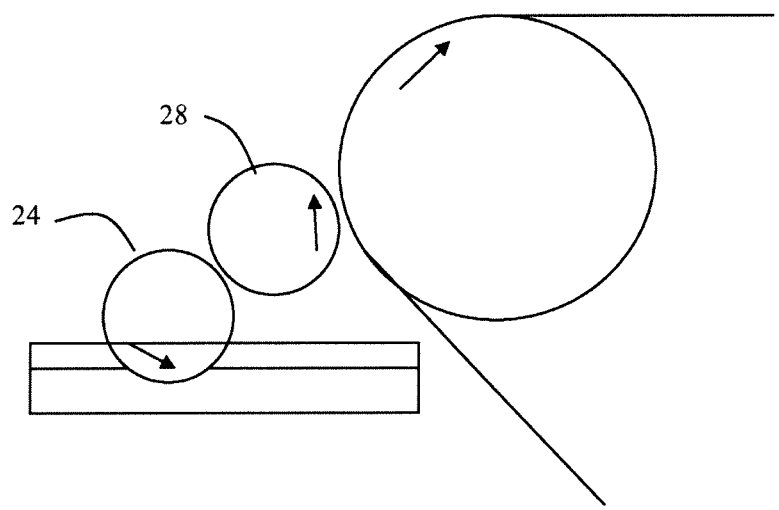
FIG. 2 is a schematic diagram of a roll paint coating applicator operating in forward coating for paint coating metal strip in accordance with an embodiment of the invention.
Figure 3:
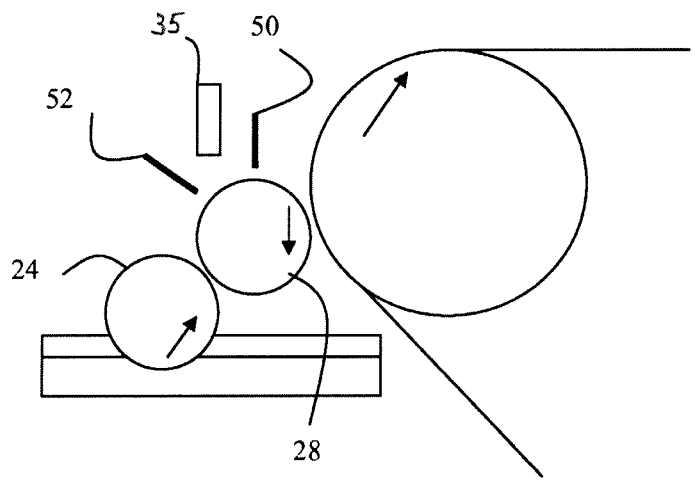
FIG. 3 is a schematic diagram of a roll paint coating applicator operating in reverse coating mode showing the doctor blade set up for measuring wet paint film thickness prior to the commencement of painting the substrate in accordance with an embodiment of the invention.

Roll paint coating applicators can also be operated in forward paint coating mode as depicted in FIG. 2. The main difference is that the paint coating rolls travel in the opposite direction relative to reverse paint coating. In forward paint coating mode the advancing paint film (on the paint coating roll) approaches the paint application point where the wet paint film is split between the substrate (metal strip) being painted and the paint coating roll. This is illustrated in FIG. 3. The ratio of the split between the paint thickness on the substrate and the paint coating roll is proportional to the speed ratio of the surface speed of the roll and the substrate. The wet paint film thickness on the applicator roll can be measured either upstream or downstream of the paint application point using method and apparatus described herein, and this value can be converted to the wet paint film thickness applied to the substrate. The determination of the wet film thickness on the substrate is dependent on whether the paint thickness measurement on the paint coating roll is made before or after the application point.

When the wet paint thickness is measured prior to the paint application point the following equation can be used:

Paint thickness on the substrate=Paint thickness on the paint coating roll×strip speed/(strip speed+roll surface speed)

When the wet paint thickness is measured after the paint application point the following equation is applied:

Paint thickness on the substrate=Paint thickness on the paint coating roll×strip speed/roll surface speed In forward paint coating mode leakage does not occur. As will be understood, the above equations can be used to calculate the thickness of the paint being, or to be, applied to the substrate. In embodiments of the invention the equations can be applied dynamically (i.e., in essentially real time or close to real time).

Wet paint film thickness can be measured either at the commencement of the painting operation and/or during the painting process to monitor paint film thickness during a production run. As will also be understood, the paint film thickness control parameters of the painting process can be adjusted in response to the measured wet paint film thickness determined from the roll surface reference and paint coating surface positional measurements obtained/calculated during the painting process.

The parameter settings of the roll paint applicator (22) (e.g., roll contact pressure, position, and roll rotational velocity) can be controlled by control means (e.g., a controller) that receives a signal from a computer linked to the displacement sensor(s) and which is suitably programmed to calculate the applicable paint coating thickness applied to the pickup roll (24), paint coating roll (28) and/or the metal strip (30) from the reference measurements and the paint coating surface measurements obtained by a method in accordance with the invention.

In some embodiments, two displacement sensors can be employed, one to measure the position of the roll surface, and the other to measure the position of the surface of the paint coating on a roll of the roll coater. In this case the sensor that measures the position of the roll may be remote from the surface of the roll, for example it may be positioned on the edge of the roll surface not covered in paint, or on the shaft of the roll. In this position the sensor may monitor the change in the position of the roll as a whole entity. For example, during prolonged operation of a roll coater the roll bearings could expand due to thermal friction or due to other external or internal temperature gradients, or the rubber coating on the roll could expand due to solvent absorption from the paint. In any of these cases the surface of the roll may move in a predictable manner. For example, as bearings expand due to thermal effects the position of the surface of the top of the roll may rise slowly over time. Measurement of a journal of the roll would pick up that change of position, and that rate of change of the position for the roll surface can be expressed as a drift factor, illustrated in FIG. 4B (61), (62), and (63). The drift factor may be linear with time or it may be exponential with time; in either case the rate of change of position can be expressed by a mathematical calculation. Anyone skilled in the art of mathematics could determine such a relationship or mathematically describe the drift behaviour. A rate of drift measured by a secondary sensor can be subtracted from the time based measured values representing the position of the surface of the wet paint on the roll, thus compensating for roll position based drift, illustrated in FIG. 4B (64), (65), and (66). Alternative methods of measuring or calculating drift include: 1) measuring changes in the position of the surface of the paint on the roll during periods of constant paint thickness on the roll, and 2) comparing measured values from a dynamic real time dry film thickness instrument with corresponding thickness values from the any instrument embodiment of the present invention over a period of time, and analysing the differences. For example, if measurements of dry film thickness show no change over a 10 minute time frame, yet the wet film thickness measurements show a reduction in thickness of 1 micrometres after conversion of dry to wet thicknesses values over the same time frame, then a drift rate of minus 0.1 micrometres per minute has been established. A correction factor is then added to ongoing measurements of wet paint film thickness at the rate of 0.1 micrometres per minute.

Desirably, respective of the displacement sensor(s) are mounted to a stage that essentially minimizes vibration from effecting the operation of the sensor(s). In particularly preferred embodiments, the (or each) displacement sensor is maintained in a substantially constant position relative to the relevant roll of the paint coating applicator (e.g., the pick-up roll or the paint coating roll) that the displacement sensor is monitoring, such that if the roll of the applicator is moved to adjust the thickness of the paint coating applied to the substrate, the sensor is likewise correspondingly moved. When a separate displacement sensor is used to measure the position of the corresponding roll surface during the application of the paint to the substrate during a production run, it can be positioned to measure a corresponding roll surface that correspondingly represents or responds to movement in the position of the roll on which the paint surface position is being measured (as described above).

Typically, the level of sturdiness and vibration retardation with regard to the mounting of respective of the displacement sensors is such that only about 1 μM or less, occurs in the position of the sensor(s) during the measurement of the position of the corresponding roll surface (s) and the surface of the paint coating on the relevant roll of the roll coating applicator by the sensor(s). Typically the mount for the sensor/s has a frequency of vibration that is less than 1000 Hz, and more preferably less than 50 Hz.

Typically, the level of sturdiness and vibration retardation with regard to the mounting of respective of the displacement sensors is such that only about 1 μM or less, and more preferably less than about 0.2 μM, of movement of the or each displacement sensor occurs in the position of the sensor(s) during the measurement of the position of the corresponding roll surface (s) and the surface of the paint coating on the relevant roll (24, 28) of the roll coating applicator (22) by the sensor(s).

Figure 4D:
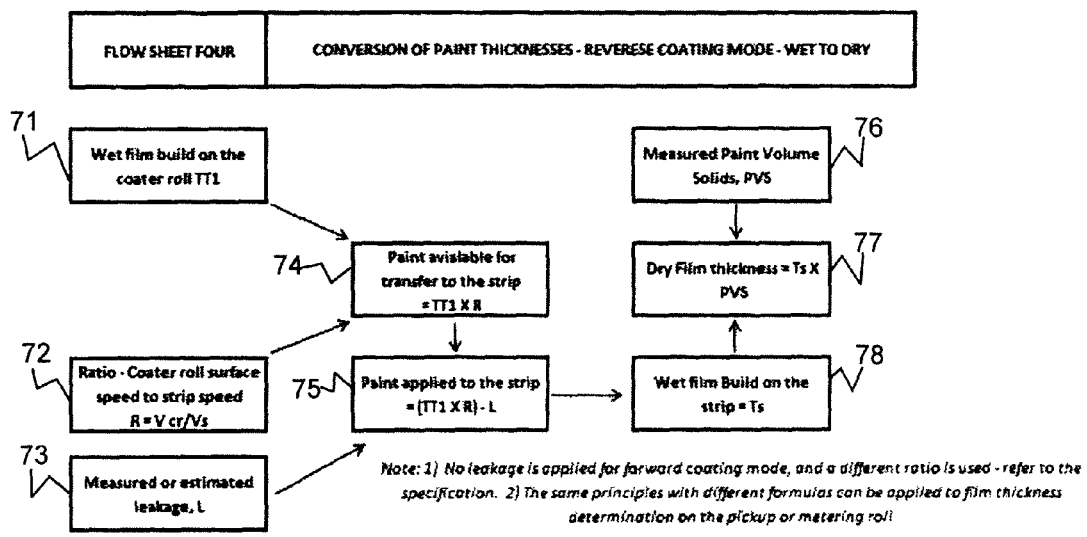

With knowledge of the volume solids of the paint (or other paint coating), illustrated in FIG. 4D (76) applied to the selected substrate (such as sheet metal strip), the final thickness of the paint coating when dry, illustrated in FIG. 4D (77) can be calculated based on the thickness of the paint coating when wet, illustrated in FIG. 4D (78). As such, the dry paint thickness on samples of the coated substrate product can be measured to monitor the thickness of the paint coating being applied to the substrate in the downstream paint coating process, and the thickness of the wet paint coating applied to the substrate can be adjusted as needed to reduce any difference in the thickness of the dry or wet paint coating compared to a corresponding target reference thickness.

For example, the logic of software in an automated paint coating thickness measurement instrument embodied by the invention may compare the determined dry film thickness (based on and utilizing the measured wet paint film thickness and the known paint volume solids) and the required target dry film thickness. The comparison may include comparison of the determined dry film thickness with the target dry film thickness. If there is no difference (providing for an allowed tolerance range and taking into account the volume solids value of the paint) no action is taken and the measurements and comparison are repeated after a predetermined time interval. If a difference to the target thickness is detected, one or more further measurements of the dry paint film and wet paint film thicknesses are obtained and compared. If the difference to the target thickness remains, control parameters of the roll coating applicator are adjusted to alter the thickness of the wet paint coat applied to the substrate. The process of measurement and comparison of paint coating thickness values is repeated throughout the paint coating process. In making the comparison between target thickness and paint coating thickness values measured on line, the wet film measurement, the dry film measurement or both of these measurements can be employed. Moreover, the wet and dry paint coating thickness measurements can be employed as cross references for each other for self calibration and self diagnosis of the measurement system.

Respective of the displacement sensors used in a method embodied by the invention can independently be any non-contact such sensor deemed suitable and employ continuous or pulsed electromagnetic waves within or outside the visible spectrum (e.g., an infra-red wavelength) to provide data indicative of the position of the corresponding roll surface and the position of the surface of the wet paint. Typically, the sensor is one that emits electromagnetic radiation signals and transmits signals corresponding to detection of returned signals from the roll or paint coating and/or corresponding roll surface to processing means in the form of a suitable analyzer and/or controller, via fiber optic cable. The sensor can be housed in a fire/explosion resistant enclosure in a paint coating room of the paint coating production line, with a window that is transparent to the emitted/return signals and which has associated electrical control circuitry/components disposed externally of the paint coating room.

Typically, respective of the displacement sensor(s) employed in the measurement of the thickness of the paint coating will have a measuring range (e.g., up to ±2 mm and more usually, ±1 mm) from the optimal distance of the sensor from the surface of the paint coating and/or substrate for making the measurements. For example, a displacement sensor with a measurement range of ±1 mm and an optimal distance from the surface of the paint coating or substrate for generating measurement data of 25 mm, the sensor can be positioned in a range of from 24 mm to 26 mm from the paint coating or substrate, illustrated in FIG. 4A (2).

A displacement sensor used in an embodiment of the invention can be selected from, but not limited to laser displacement sensors, confocal chromatic displacement sensors and displacement sensors that employ white light wavelengths and a lens system of known chromatic aberration. The last two of the above type of displacement sensor emit essentially white light with wavelengths that are in focus at different distances from the sensor. With those sensors, the distance measurement is based on determining the wavelength that is in focus at the target surface. The use of an intrinsically safe sensor represents an embodiment of the present invention.

Measurement of the positions of the surface of the wet paint coating and the corresponding roll surface are generally made at sensor frequencies of at least 0.5 kHz or greater, more usually at least about 10 kHz Typically, a displacement sensor employed in a method embodied by the invention will measure the distance to the corresponding roll surface and/or the surface of the paint coating as described herein to within a tolerance of ±1 μM and more usually, to within a tolerance of ±0.1 μM.

Typically, the substrate (i.e., sheet metal strip) travels at a speed relative to the displacement sensor(s) in a range of from about 10 meters per minute to 220 meters per minute while the data sets for determination of the thickness of the applied paint coating are obtained and most usually, in a range between about 20, 40, 60, 80 100, 120 or 150 meters per minute up to 200 meters per minute.

Moreover, the thickness of the wet paint coating applied to the substrate can be monitored and controlled to within a tolerance from a desired predetermined thickness of about 10% or less and generally, to within about 8% or 4% or less (e.g., within 3%, 2% or 1% of the target predetermined paint coating thickness).

Typically, a paint top coat is applied to the substrate to have a thickness when dried, of about 40 µM or less, usually in a range of from about 16 µM to 40 µM and more usually, about 18 µM. However, the thickness of the paint is dependent on the paint type and the end product use. For example, plastisols are typically applied at a thickness of greater than 80 µM while backing coats and primer coats are typically applied at a thickness of from about 5 to about 12 µM.

As described above, the thickness of the wet paint coating applied to the steel strip substrate can be measured during the paint coating of the strip with the paint and is continuously monitored to control the thickness of the paint coating within a predetermined thickness range. In the event the measured thickness deviates from this range, one or more parameters of the paint coating process (e.g., the settings of the roll coating applicator) can be adjusted to reduce the difference between the measured thickness and the desired predetermined thickness. Alternatively, the paint viscosity can be adjusted, for example by adjusting the paint temperature. The commercially available Saint Claire paint heat exchange system can be employed to achieve this effect.

While embodiments of the invention have been described in the context of applying a paint coating to metal (e.g., uncoiled steel) strip such as for being roll formed into roofing or fencing panels with a waveform cross-sectional profile (e.g., corrugated or saw-tooth profiles), steel or aluminium strip or the like can also be coated with paint having a controlled thickness for fabrication of other products such as slats for Venetian blinds, cool room panels, and panels for fabrication of white goods and appliances, motor vehicle parts, and a myriad of other items. Moreover, methods and instruments/apparatus embodied by the invention can be used to measure the thickness of paint coatings other than paint and the invention is not limited thereto.

Apparatus such as a paint/paint coating production line or roll coating applicator for applying the relevant paint coating to the substrate, that includes an instrument embodied by the invention or is otherwise provided in combination with an instrument as described herein, is also expressly encompassed by the invention.

The invention is described further below by way of a number of non-limiting Examples which utilise a non-contact, precision confocal displacement sensor.

Example 1

Measurement of Wet Paint Film Thickness on Rolls of an Industrial Roll Paint Applicator for Painting Steel Strip Prior to the Commencement of Paint Application to the Substrate The paint applicator is set up for a production run or to a close approximation of production conditions with reference to roll positions (i.e., pick up roll and paint coating rolls) and roll rotational velocities and the like, but with no paint on the rolls. Reference measurements at precise lateral and circumferential points along either the pickup roll or paint coating roll are then obtained using a displacement sensor during the rotation of the roll. A displacement sensor is optionally also used to record the overall position of the roll. These reference measurements provide a baseline which reflects the rolls eccentricity and mechanical movement variations.

The paint applicator is then set up with paint on the rolls and roll contact pressure, position, and rotational velocity settings used for a production run, preferably without changing the setting values (other than contact pressure) used to obtain the baseline. Applying paint to rolls of the roll paint coating applicator and adjusting the pressure/position of the rolls affects the reference measurements for the roll being scanned. However, this can be compensated for by using a sensor to measure the shift in overall position of the roll, and accounting for this in determination of the reference value(s). Paint coating surface measurements for the wet paint layer on the same roll are then obtained via the displacement sensor at the same locations as for the reference measurements. The wet paint film thickness is calculated by subtracting the readings obtained with and without the wet paint layer on the roll. Each measurement of the paint coat surface is subtracted from the corresponding measurement of the roll corresponding roll surface to provide thickness measurements of the paint on the roll. The operating settings of the paint applicator are then adjusted as needed to obtain a paint coating on the steel strip substrate within the desired paint thickness range.

Example 2

Measuring Wet Paint Film Thickness on Rolls of an Industrial Roll Paint Applicator for Painting Steel Strip Prior to the Commencement of Paint Application to the Substrate The paint applicator is set up for a production run or to a close approximation of production conditions with reference to roll positions (i.e., pick up roll and paint coating rolls) and roll rotational velocities and the like, but with no paint on the rolls. Reference measurements at precise circumferential points along of the pickup roll or paint coating roll are then obtained using a displacement sensor during the rotation of the roll and an averaged position of the surface of the roll is calculated to provide a baseline which reflects the rolls eccentricity and mechanical movement variations. A number of corresponding roll surface measurements are taken during the revolution of the roll, and these are averaged for one or more complete rotations of the roll.

As in the method described in Example 1, the paint applicator is then set up with paint on the rolls and roll contact pressure, position, and rotational velocity settings used for a production run, preferably without changing the setting values (except for roll contact pressure) used to obtain the baseline. However, in this instance, paint coating surface measurements for the wet paint layer on the same roll are obtained via the displacement sensor during the rotation of the roll as for the reference measurements, and averaged over a whole number of revolutions to provide a measurement of the position of the surface of the wet paint film in the same way as the average value(s) for the corresponding roll surface measurements were calculated. The thickness of the wet paint film is calculated by subtracting the average baseline measurement from the averaged measurement of the position of the surface of the wet paint film. As with the method described in Example 1, the operating settings of the paint applicator are then adjusted as needed to obtain a paint coating on the steel strip substrate within the desired paint thickness range. Also as with the method described in Example 1, the change in position of the roll being measured arising from adjusting the positions of the surface of the paint coating and the pick-up roll can be measured and taken into account.

Example 3

Determination of Wet Paint Film Thickness on Rolls of an Industrial Roll Paint Applicator for Painting Steel Strip Based on Dry Paint Film Thickness Values The paint applicator is set up for a production run or to a close approximation of production conditions with reference to roll positions (i.e., pick up roll and paint coating rolls) and roll rotational velocities and the like, and paint is applied to the rolls. An average baseline reflecting the position of the surface of the wet paint film on either the pickup roll or paint coating roll is obtained as in Example 2. This baseline can optionally be set to zero. The thickness of the dry paint layer (paint build) on coated samples of the steel strip substrate measured from the end of the production line is then determined (that is, the thickness of the paint applied to the steel strip when cured and/or dried) using any suitable method. The difference between the value of the measured dry paint film thickness on the samples and a target reference dried paint thickness value is then determined. With knowledge of the baseline/zero position of the surface of the wet paint film on the pickup roll or paint coating roll is calculated to achieve, the target dried paint thickness on the substrate to which the paint is being applied (e.g., steel strip). This calculation can be based on knowledge of the volume solids parameter(s) of the wet paint. Once the actual dry film thickness of production is known, the previously measured reference value is adjusted to equate to an equivalent wet film thickness, after which dynamic essentially real time measurements of wet paint thickness can be determined from ongoing measurement of the surface position of paint on the applicable roll of the roll paint coating applicator.

For example, if the dry paint thickness exiting the curing oven is determined to be 2 μM too thick and the position of the surface of the wet paint film on the paint coating roll has been established, the wet paint thickness on the paint coating roll can be reduced by 4 μM (assuming a measured 50% paint volume solids value for the paint in use). That is, the paint surface position on the paint coating roll as determined by the displacement sensor is reduced until a reading is obtained that is 4 μM less as measured by the sensor. (This assumes a reverse paint coating mode and a paint coating roll rotational velocity essentially equivalent to the speed of travel of the strip, and essentially no change in paint being transferred to the paint coating roll at the paint application point.) The value of the reading of wet paint thickness from the sensor is then adjusted to equate to the known dry film thickness achieved on the strip. Thereafter, further measurements by the sensor provide ongoing values for dry (or wet) paint thickness by monitoring the change in wet paint film surface position (delta T), and subtracting the delta T from the previously determined value for coating thickness obtained from dynamic dry film thickness measurements. Conversions of wet to dry thicknesses (and vice versa) have been described previously. That is, in this example, the measured dry film thickness provides the ongoing reference value.

The thickness of the wet paint film on the pick-up roll or paint coating roll is monitored during the "production run" and the paint film thickness/build on the pick-up roll or paint coating roll is adjusted during the run in response to the measured/calculated wet paint thickness as needed to maintain the target dry paint thickness at the desired level (e.g., within predetermined thickness parameters).

Example 4

Determination of Wet Paint Film Thickness on Rolls of an Industrial Roll Paint Applicator Prior to the Commencement of Painting FIG. 3 illustrates the arrangement of this example. The paint applicator is set up for a production run or to a close approximation of production conditions with reference to roll positions (i.e., pick up roll and paint coating rolls) and roll rotational velocities and the like, and paint is applied to the rolls. A narrow polymeric low pressure doctor blade 50 is applied to the paint coating roll downstream essentially in line with the sensor. The position of the surface of the wet paint layer on the paint coating roll is determined using a suitable sensor. A second narrow doctor blade 52 is temporarily applied in line and upstream of the sensor to essentially remove all of the paint from at least a portion of the surface of the roll enabling the displacement sensor (or a further displacement sensor) to measure the roll surface position (reference value). The wet paint thickness on the paint coating roll is then calculated by subtraction of the roll surface position measurement (i.e., obtained when both doctor blades are in contact with the roll) from the position measurement determined for the surface of the wet paint layer (with only the downstream doctor blade in contact with the roll). The wet paint thickness is thus measured by the sensor with its now known reference value, and the paint applicator can be adjusted to obtain the required thickness of the wet paint layer for application to the substrate. This method can also be adopted for use with the pick-up roll. Interrupting the paint flow on the pick-up roll would not result in areas of uncoated product. Hence in this instance, the method could be used during ongoing production/painting.

Optionally, the dry paint thickness on the coated steel strip can also be controlled by a method as described herein by monitoring the thickness of the wet paint applied to the substrate, and the roll paint applicator adjusted to alter its paint coating parameters to achieve a new wet paint film thickness on the pick-up roll or paint coating roll that more closely corresponds to the predetermined target dry film thickness for the strip/substrate. Alternatively, the wet paint thickness/build and/or the dry paint thickness/build can be monitored during the production run and the paint thickness paint coating parameters of the pick-up roll or paint coating roll adjusted as needed during the paint coating process to maintain the thickness of the wet paint layer/dry paint layer on the substrate to within the target thickness range.

Although a number of embodiments have been described, it will be appreciated by persons skilled in the art that numerous variations and/or modifications may be made without departing from the spirit or scope of the invention as broadly described. The present embodiments are, therefore, to be considered in all respects as illustrative and not restrictive.

The invention claimed is:

1. An instrument for measuring a first thickness of a paint coating on a rotating roll of a roll coating applicator roll for determination of a second thickness of the paint coating to be applied to a moving substrate, the instrument comprising:
    sensor means arranged for emitting and detecting signals reflected from a surface of the paint coating on at least one roll of the roll coating applicator to generate data indicative of the position of a surface of the paint coating on the at least one roll, the sensor means being distanced from the surface of the paint coating for the emission and detection of the signals; and processing means for processing the data generated by the sensor means to determine the second thickness of the paint coating to be applied to the substrate.

2. The instrument according to claim 1 wherein the processing means is adapted to process the data generated by the sensor means and to process reference data to determine the first thickness of the paint coating on the roll, the processing means adapted to store the reference data or derivatives of the reference data for ongoing use in determination of the second thickness of the paint coating to be applied to the substrate.

3. The instrument according to claim 2 wherein the reference data comprises measurements of a position of the surface of the roll of the roll coating applicator and wherein the sensor means is adapted to derive the reference data.

4. The instrument according to claim 3 further comprising a doctor blade located upstream of the sensor means, the doctor blade adapted for periodic removal of a portion of wet paint to expose the surface of the roll of the roll coating applicator.

5. The instrument according to claim 3 further comprising a doctor blade located downstream of the sensor means, the doctor blade adapted for periodic removal of wet paint to expose a portion of the surface of the roll of the roll coating applicator that is in line with the sensor means.

6. The instrument according to claim 5, wherein the instrument is adapted to apply the downstream doctor blade to the roll surface during periods when the roll coating applicator roll is not applying paint to the substrate and is adapted to apply the upstream doctor blade during periods when the downstream doctor blade is applied to the roll surface.

7. The instrument according to claim 2, wherein the instrument is adapted to derive the reference data from measurements of a selected dry surface of the roll coating applicator roll by a second sensor means.

8. The instrument according to claim 1 in which the sensor means is intrinsically safe, and the signal of the sensor means comprises white light, and the reflected signal from the surface being measured comprises a focused portion or band of reflected wavelengths of light within the visible light spectrum.

9. The instrument according to claim 1 wherein the instrument is adapted to measure the thickness of the paint coating to be applied to the substrate during setting up of the roll coating applicator prior to application of the paint coating to the substrate by the roll coating applicator and/or to measure the thickness of the paint coating as it is applied to the substrate.

10. The instrument according to claim 2 wherein the instrument is adapted to derive the reference data from on-line dynamic measurements of the second thickness of the paint coating applied to the moving substrate after the paint coating has been dried.

11. The instrument according to claim 2 in which the processing means is adapted for processing the data generated by the sensor means and for processing the reference data to determine a further reference factor that is a derivative of a first coating thickness, measured by the instrument, the instrument further comprising memory means to store the further reference factor, the further reference factor being for use in combination with subsequent measurements of the position of the surface of the paint coating on the roll of the roll coating apparatus to determine ongoing paint coating thickness values on the roll surface, and optionally, periodically updating the further reference factor.

12. The instrument according to claim 1 wherein the instrument is adapted to compare the determined first thickness of the paint coating with a predetermined target thickness, and if the determined first thickness differs from the target thickness, to adjust the first thickness of the paint coating to reduce the difference between the determined thickness and the target thickness.

13. The instrument according to claim 12 wherein the instrument is adapted to adjust one or more operating parameters of the roll coating applicator to reduce the difference between the determined thickness of the paint coating and the target thickness.

14. The instrument according to claim 1 wherein the data indicative of at least one of the position of the surface of the paint coating on the roll of the roll coating applicator and the position of the corresponding roll surface indicates an averaged said position taken over substantially a whole number of revolutions of the roll.

15. The instrument according to claim 1 in which the determination of the second paint thickness being applied to the substrate takes account of a measured or an estimated paint transfer efficiency factor or leakage between the roll coating apparatus coating roll and the moving substrate.

16. The instrument according to claim 1 in which the measured first paint coating thickness on the roll of the roll coating applicator is converted by the processing means to the corresponding second paint coating thickness to be applied to the substrate.

17. The instrument according to any one of claim 1 in which the measured first paint coating thickness on the roll of the roll coating applicator to be applied to the moving substrate is converted to the corresponding second paint coating thickness using a measured value for paint volume solids.

18. The instrument according to claim 1 wherein the paint coating is selected from the group consisting of a layer of ink, paint, lacquer, varnish, plastisol, an aqueous slurry, a hot melt paint coating, molten polymer paint coating, inorganic chemical coating, conversion coating, and a pre-treatment coating.

19. A method for measuring the thickness of a paint coating applied to a substrate by a roll coating applicator, the method comprising the steps of:
(a) providing sensor means for emitting and detecting signals reflected from a surface of the paint coating on at least one rotating roll of the roll coating applicator and at least one corresponding rotating roll surface to generate one or more data sets consisting of a first data set indicative of the position of the surface of the paint coating on the roll and a second data set indicative of the position of the corresponding roll surface;
(b) generating the first data set and the second data set using the sensor means to measure the position of the surface of the paint coating and the corresponding roll surface, the sensor means being distanced from the roll and the corresponding roll surface for the emission and detection of the signals; and
(c) processing the first and second data sets generated by the sensor means to determine a first thickness of the paint coating on the roll for measurement of a second thickness of the paint coating applied to the substrate.

20. The method according to claim 19 further comprising the steps of
measuring the thickness of the paint coating to be applied to the substrate during setting up of the roll coating applicator prior to application of the paint coating to the substrate by the roll coating applicator; and
measuring the thickness of the paint coating being applied to the substrate;
comparing the thickness of the paint coating being applied to the substrate with a target thickness; and
adjusting the thickness of the paint coating being applied to the substrate.

* * * * *